United States Patent
Lott et al.

(10) Patent No.: US 10,830,122 B2
(45) Date of Patent: Nov. 10, 2020

(54) INTAKE AND CHARGE AIR COOLING SYSTEM

(71) Applicants: Eric M Lott, Oxford, MI (US); Hussam El-Jobran, Auburn Hills, MI (US)

(72) Inventors: Eric M Lott, Oxford, MI (US); Hussam El-Jobran, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/173,325

(22) Filed: Oct. 29, 2018

(65) Prior Publication Data

US 2020/0131979 A1    Apr. 30, 2020

(51) Int. Cl.
F02B 29/04 (2006.01)
F01P 9/06 (2006.01)
F01P 7/16 (2006.01)

(52) U.S. Cl.
CPC .......... F02B 29/0412 (2013.01); F01P 7/165 (2013.01); F01P 9/06 (2013.01); F02B 29/0431 (2013.01); F02B 29/0443 (2013.01); F02B 29/0493 (2013.01); F01P 2060/02 (2013.01)

(58) Field of Classification Search
CPC .............. F02B 29/0412; F02B 29/0443; F02B 29/0431; F02B 29/0493; F01P 9/06; F01P 7/165; F01P 2060/02
See application file for complete search history.

(56) References Cited

U.S. PATENT DOCUMENTS

| 4,317,439 A | * | 3/1982 | Emmerling | F01P 3/20 |
| | | | | 123/563 |
| 6,748,934 B2 | | 6/2004 | Natkin et al. | |
| 6,796,134 B1 | | 9/2004 | Bucknell et al. | |
| 9,506,395 B2 | | 11/2016 | Isermeyer et al. | |
| 10,006,339 B2 | | 6/2018 | Chen et al. | |
| 2003/0015183 A1 | | 1/2003 | Sealy et al. | |
| 2005/0072169 A1 | | 4/2005 | Lin | |
| 2006/0086089 A1 | * | 4/2006 | Ge | F02B 29/0418 |
| | | | | 60/599 |
| 2007/0204614 A1 | * | 9/2007 | Kolb | F28D 1/0435 |
| | | | | 60/599 |
| 2009/0145409 A1 | | 6/2009 | Noyama et al. | |
| 2010/0139626 A1 | | 6/2010 | Raab et al. | |
| 2011/0203304 A1 | | 8/2011 | Sato et al. | |
| 2013/0068202 A1 | | 3/2013 | Kardos et al. | |
| 2014/0374498 A1 | | 12/2014 | Quix et al. | |
| 2015/0040874 A1 | * | 2/2015 | Isermeyer | B60H 1/00271 |
| | | | | 123/563 |
| 2018/0215234 A1 | | 8/2018 | Lott et al. | |

* cited by examiner

*Primary Examiner* — Brandon D Lee
(74) *Attorney, Agent, or Firm* — Ralph E. Smith

(57) ABSTRACT

An air cooling system for a vehicle engine includes an air intake configured to receive intake air for delivery to the engine, a first coolant loop thermally coupled to the air intake to provide cooling to the intake air, and a second coolant loop thermally coupled to the air intake to provide further cooling to the intake air. The first and second coolant loops are separate loops using a common condenser

10 Claims, 3 Drawing Sheets

INTAKE AND CHARGE AIR COOLING SYSTEM

FIELD

The present application generally relates to cooling vehicle engine intake air and, more particularly, to cooling intake air with a dual coolant loop.

BACKGROUND

Some conventional vehicles include a turbocharger and/or a supercharger, which increase the air or air/fuel mixture density of an engine by increasing the pressure of the intake air stream prior to its entering a cylinder of the engine. Increasing the density of air in the cylinder may be desirable because it provides a method of increasing the power generated by the engine. Since pressure is directly related to heat, as the charger increases the pressure of the intake air stream, it also increases the temperature. Cooling of this charged intake air stream enables an additional increase in its pressure since cooler air can be more densely packed. This additional cooling is typically accomplished through the use of an intercooler.

Some intercoolers may include a secondary cooling feature provided by an additional component such as, for example, a vehicle air conditioning circuit. However, such systems typically continuously draw cooling from the additional component, thereby overworking the system and reducing its performance. Moreover, the additional component will need to be increased in size to support the secondary cooling in addition to its primary operation. Accordingly, while such conventional intercooler cooling systems work for their intended purpose, it is desirable to provide an improved intercooler cooling system with improved control features.

SUMMARY

According to one example aspect of the invention, an air cooling system for a vehicle engine is provided. In one example implementation, the system includes an air intake configured to receive intake air for delivery to the engine, a first coolant loop thermally coupled to the air intake to provide cooling to the intake air, and a second coolant loop thermally coupled to the air intake to provide further cooling to the intake air.

In addition to the foregoing, the described system may include one or more of the following features: wherein the intake air is compressed charge air received from a turbocharger or a supercharger, and wherein the air intake is an intercooler configured to cool the compressed charge, wherein the first coolant loop thermally is coupled to the intercooler to provide cooling to the compressed charge air, and wherein the second coolant loop is thermally coupled to the intercooler to provide further cooling to the compressed charge air; wherein the intake air is compressed charge air received from a turbocharger or a supercharger, and wherein the air intake is an intercooler configured to cool the compressed charge air, wherein the first coolant loop thermally is coupled to the intercooler to provide cooling to the compressed charge air, and wherein the second coolant loop is thermally coupled to the intercooler to provide further cooling to the compressed charge air.

In addition to the foregoing, the described system may include one or more of the following features: wherein the intercooler includes a first charge air cooler layer and a second charge air cooler layer; wherein the first coolant loop is thermally coupled to the first charge air cooler layer and the second coolant loop is thermally coupled to the second charge air cooler layer; wherein the first coolant loop and the second coolant loop share a condenser; and wherein the first and second coolant loops circulate a shared refrigerant.

In addition to the foregoing, the described system may include one or more of the following features: wherein the first coolant loop includes a pump to circulate a coolant therethrough; wherein the second coolant loop includes a compressor to circulate the coolant therethrough; wherein the second coolant loop includes an expansion valve upstream of the intercooler and downstream of a condenser; wherein the second coolant loop includes a first internal heat exchanger and a second internal heat exchanger; and wherein the first internal heat exchanger is disposed upstream of the expansion valve and downstream of the condenser, and the second internal heat exchanger is disposed downstream of the intercooler and upstream of the compressor.

In addition to the foregoing, the described system may include one or more of the following features: a controller in signal communication with the pump and the compressor, wherein upon receipt of a signal indicating a first measured air charge temperature (ACT) is greater than a target ACT, the controller is configured to turn the pump on; wherein upon receipt of a signal indicating a second measured ACT is greater than the target ACT, the controller is configured to turn the compressor on; wherein upon receipt of a signal indicating a third measured ACT is greater than the target ACT, the controller is configured to de-rate the vehicle engine; and wherein upon receipt of a signal indicating the third measured ACT is less than the target ACT, the controller is configured to turn off the compressor, and wherein upon receipt of a signal indicating the second measured ACT is less than the target ACT, the controller is configured to turn off the pump.

According to another example aspect of the invention, a method of controlling a vehicle having an engine and a controller in communication with a charge air cooling system is provided. In one exemplary implementation, the charge air cooling system includes an intercooler configured to cool compressed charge air received from a turbocharger or a supercharger, a first coolant loop thermally coupled to the intercooler to provide cooling to the compressed charge air, and a second coolant loop fluidly coupled to the first coolant loop, the second coolant loop thermally coupled to the intercooler to provide further cooling to the compressed charge air. In the example implementation, the method includes circulating a coolant in the first coolant loop when a first measured air charge temperature (ACT) is greater than a target ACT, and while the coolant is circulating in the first coolant loop, circulating the coolant in the second coolant loop when a second measured ACT is greater than the target ACT.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein is an intake air cooling system configured to provide cooling to intake air passing into a naturally aspirated engine or charge air passing through a dual layer intercooler. In a forced induction engine, a first coolant circuit provides cooling to the first layer of the intercooler, and a second coolant circuit provides further cooling to the second layer of the intercooler. The two coolant circuits share a coolant and a condenser, which eliminates the need for a dedicated low temperature cooling circuit.

Figure 1:
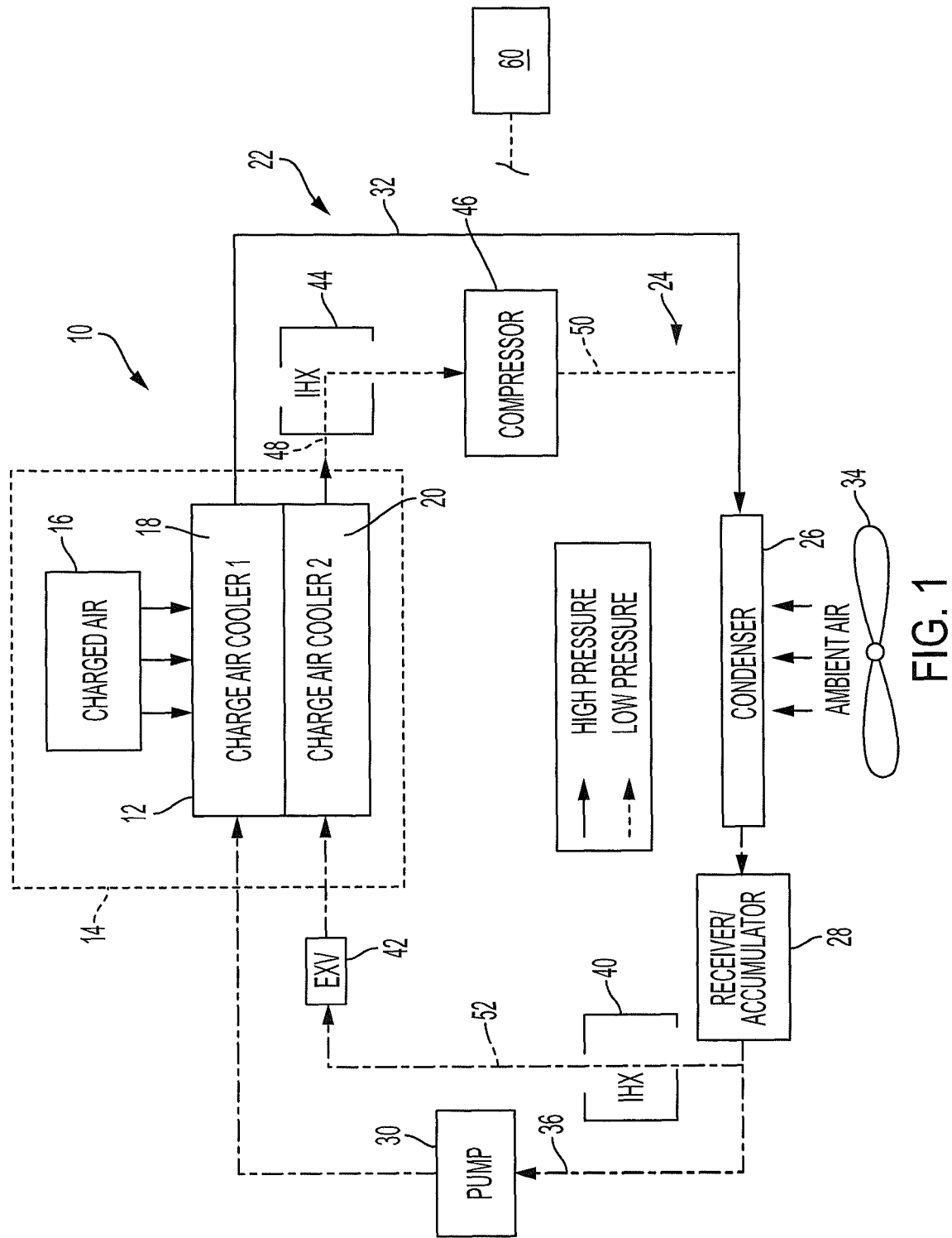
FIG. 1 is a schematic view of an example charge air cooler system in accordance with the principles of the present disclosure.

With initial reference to FIG. 1, an example charge air cooler system for a vehicle engine is illustrated and generally identified at reference numeral 10. The charge air cooler system 10 is configured to provide cooling to an intercooler or charge air cooler (CAC) 12 of a vehicle engine 14 that includes a turbocharger or supercharger 16. However, it will be appreciated that system 10 is not limited to forced induction engines and may be utilized to cool intake air for a naturally aspirated engine. In such embodiments, CAC 12 is instead an or includes an air intake 12. In other embodiments, system 10 may be utilized to provide cooling to various other vehicles or systems such as, for example, marine or aeronautical systems, HVAC systems, buildings or other structures, etc.

In the example embodiment, the CAC 12 receives hot compressed air from the charger 16, absorbs heat therefrom, and subsequently supplies cooled, compressed air to an intake and cylinders (not shown) of the engine 14. In the illustrated example, CAC 12 is a two-stage, two-phase evaporative charge air cooler having a first cooler or layer 18 and a second cooler or layer 20. In one exemplary embodiment, the two layers 18, 20 are separate and distinct layers. Accordingly, after the hot compressed air from the charger 16 is cooled in the first CAC layer 18, the cooled compressed air is further cooled in the second CAC layer 20 to below ambient temperature, as described herein in more detail. Such reduced charge air temperatures provide benefits such as increased charge density (power) and knock mitigation.

In the example implementation, the charge air cooler system 10 generally includes a first coolant circuit or loop 22 and a second coolant circuit or loop 24 having a shared condenser 26 and a shared coolant. In the example embodiment, the shared coolant is a refrigerant such as, for example, R-1234yf. However, it will be appreciated that system 10 may use any suitable coolant or refrigerant that enables system 10 to function as described herein. As such, the combined coolant loops 22, 24 enable charge air cooler system 10 to provide charge air cooling without a dedicated low temperature cooling circuit.

The charge air cooler system 10 is in signal communication with a controller 60 such as an engine control module (ECM). As described herein in more detail, the ECM is configured to selectively initiate a flow of coolant through the second loop 24 to provide increased cooling to intercooler 12, particularly the second CAC layer 20, which results in increased engine power and performance and/or improved fuel economy. Moreover, separate control strategies for this secondary cooling in the second CAC layer 20 may be utilized to provide optimal intercooler cooling for a given mode of vehicle operation such as a "race mode" or a "track mode."

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In one example implementation, the first coolant loop 22 is thermally coupled to the first CAC layer 18 and is configured to provide cooling to the hot compressed charge air passing therethrough. In the example embodiment, first coolant loop 22 generally includes condenser 26, a receiver/accumulator 28, and a pump 30. The pump 30 is configured to pump the coolant around the first coolant loop 22 to the first CAC layer 18 where the coolant is subsequently heated by the hot compressed charge air. The heated coolant is subsequently directed through a conduit 32 to the condenser 26 (e.g., a vehicle radiator) where it is cooled by ambient air, airflow created by a fan 34, and/or ram air. The resulting cooled coolant is then circulated through a conduit 36 and returned to the first CAC layer 18 to repeat the cycle. In the example embodiment, the receiver/accumulator 28 is disposed on conduit 36 downstream of the condenser 26 and upstream of the branch to the second coolant loop 24.

In the example implementation, the second coolant loop 24 is fluidly coupled to the first coolant loop 22 and circulates the same coolant therethrough. However, the second coolant loop 24 is dedicated to providing cooling to the second CAC layer 20. In the example embodiment, the second coolant loop 24 generally includes a first internal heat exchanger 40, an expansion valve 42, a second internal heat exchanger 44, and a compressor 46. The compressor 46 is selectively activated (e.g., by controller 60) to circulate the coolant around the second coolant loop 24 to provide the second CAC layer 20 with coolant, which is subsequently heated by the cooled compressed charge air from the first CAC layer 18. Such additional cooling by the second coolant loop 24 enables the compressed charge air to be further cooled, for example, to a temperature below ambient.

After providing cooling in the second CAC layer 20, the now heated coolant is subsequently directed through a conduit 48 to the second internal heat exchanger 44 where it is further heated by indirect heat exchange with the coolant flowing through the first internal heat exchanger 40. The heated coolant is then directed to the compressor 46 where it compressed and directed through a conduit 50 that is fluidly coupled to the conduit 32. The compressed coolant then flows into conduit 32 and is subsequently directed through condenser 26 where it is cooled by ambient air, an airflow created by fan 34, and/or ram air.

While the compressor 46 is operating, a portion of the cooled coolant from the condenser 26 is drawn into a conduit 52 of the second coolant loop 24 that branches off of conduit 36. The coolant in conduit 52 is subsequently cooled in the first internal heat exchanger 40 by indirect heat exchange with the heated coolant passing through the second internal heat exchanger 44. The cooled coolant is then directed to the expansion valve 42 where it is reduced in pressure and further cooled before entering the second CAC layer 20. The coolant then returns to compressor 46 and repeats the cycle.

In one example, the charge air cooler system 10 provides two-phase heat transfer in both the first and second coolant loops 22, 24, and the second coolant loop 24 is a typical vapor compression cycle. More specifically, in the first coolant loop 22, the cooled coolant exits the condenser 26 as a subcooled liquid and is pumped through conduit 36 to the first CAC layer 18. Heating in the first CAC layer 18 results in a two-phase fluid or superheated vapor, which is subsequently directed through conduit 32 back to condenser 26.

In the second coolant loop 24, the cooled coolant exiting the condenser as a subcooled liquid is drawn into conduit 52 by the pumping action of compressor 46. The subcooled liquid is further subcooled in internal heat exchanger 40 to increase the available heat of vaporization, thereby reducing mass flow rate required through compressor 46. As such, the total work of the compressor 46 is reduced, resulting in improved efficiency of the cycle. The subcooled liquid is expanded by expansion valve 42 and the resulting two-phase fluid is directed to the second CAC layer 20. Heating in the second CAC layer 20 results in a superheated vapor, which is subsequently directed through conduit 48 back to compressor 46. The superheated vapor is then directed back to condenser 26 via conduits 50, 32 for subsequent cooling.

If flow is only desired through first coolant loop 22, compressor 46 is turned off and/or expansion valve 42 is closed. Flow only through the first coolant loop may be a default mode of operation for normal or typical driving and/or for improved fuel economy operation of the vehicle. When reduced air charge temperature (ACT) is required or requested, for example when high levels of torque are requested (e.g., racing or track mode), compressor 46 is turned on and expansion valve 42 is opened (if it was closed) to initiate a flow of coolant through the second coolant loop 24. This provides reduced air charge temperature to facilitate significantly increasing engine performance and power output.

Figure 2:
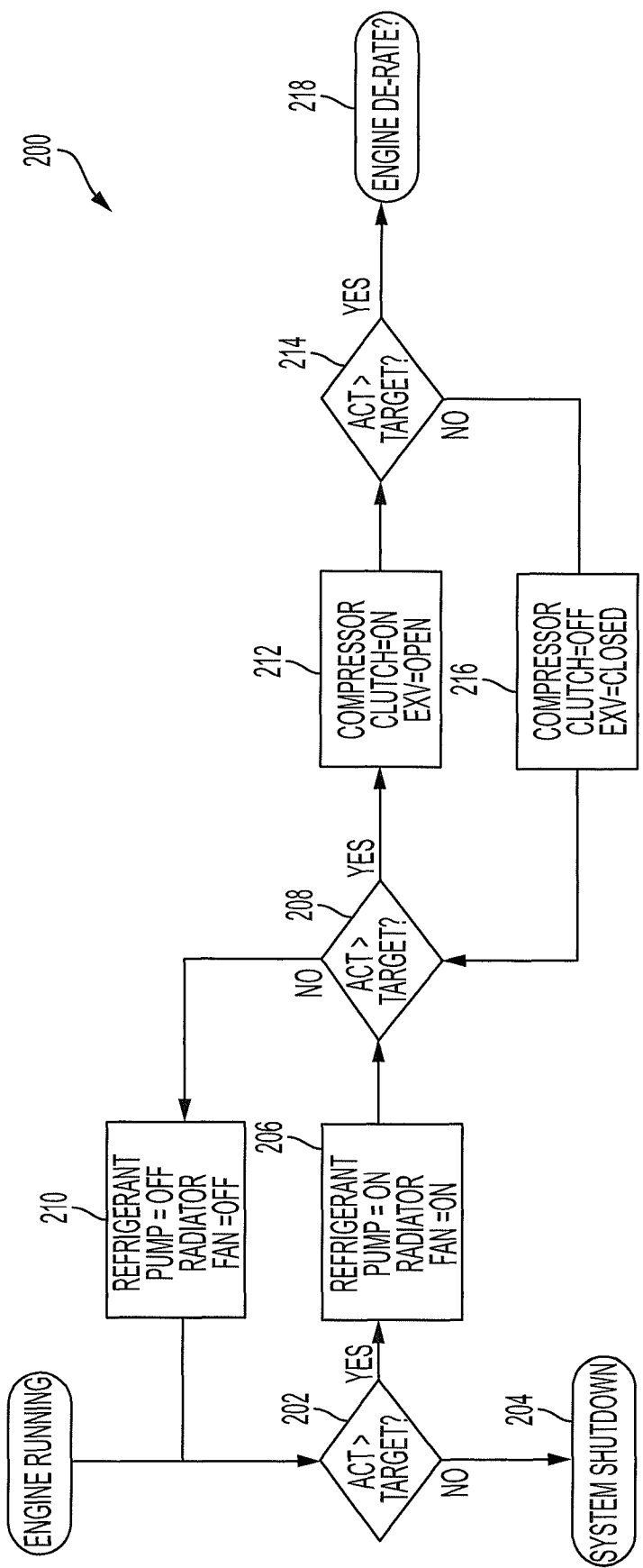
FIG. 2 is a schematic diagram of an example operation of the charge air cooler system shown in FIG. 1 in accordance with the principles of the present disclosure.

FIG. 2 illustrates an example method 200 of controlling a vehicle having charge air cooler system 10. The method includes determining if a first measured ACT is greater than a target ACT at step 202. Such temperature measurements may be performed with various vehicle sensors such as a temperature sensor (not shown). In some examples, the target ACT is determined by controller 60 or other vehicle control depending on a given driving mode or request (e.g., driver requests the vehicle to enter a race mode). In one example, the target ACT is below a measured ambient temperature. If the first measured ACT is not greater than the target ACT, the system 10 is shut down at step 204. In one example, system 10 is shut down in reverse order by first turning off compressor 46 and closing expansion valve 42 followed by turning off pump 30.

If the first measured ACT is greater than the target ACT, control proceeds to step 206 where pump 30 and radiator fan 34 are turned on. At step 208, it is determined if a second measured ACT is greater than the target ACT. The second measured ACT is determined after the pump 30 and radiator fan 34 are turned on. If the second measured ACT is not greater than the target ACT, control proceeds to step 210 where pump 30 and radiator fan 34 are turned off. Control then returns to step 202.

If the second measured ACT is greater than the target ACT, control proceeds to step 212 where compressor 46 is turned on and expansion valve 42 is opened. At step 214, it is determined if a third measured ACT is greater than a target ACT. The third measured ACT is determined after the compressor 46 is turned on and the expansion valve 42 is opened. If the third measured ACT is not greater than the target ACT, control proceeds to step 216 where the compressor 46 is turned off and expansion valve 42 is closed. Control then returns to step 208. If the third measured ACT is greater than the target ACT, control proceeds to step 218 and the controller 60 determines whether to take further action such as performing an engine de-rate.

Figure 3:
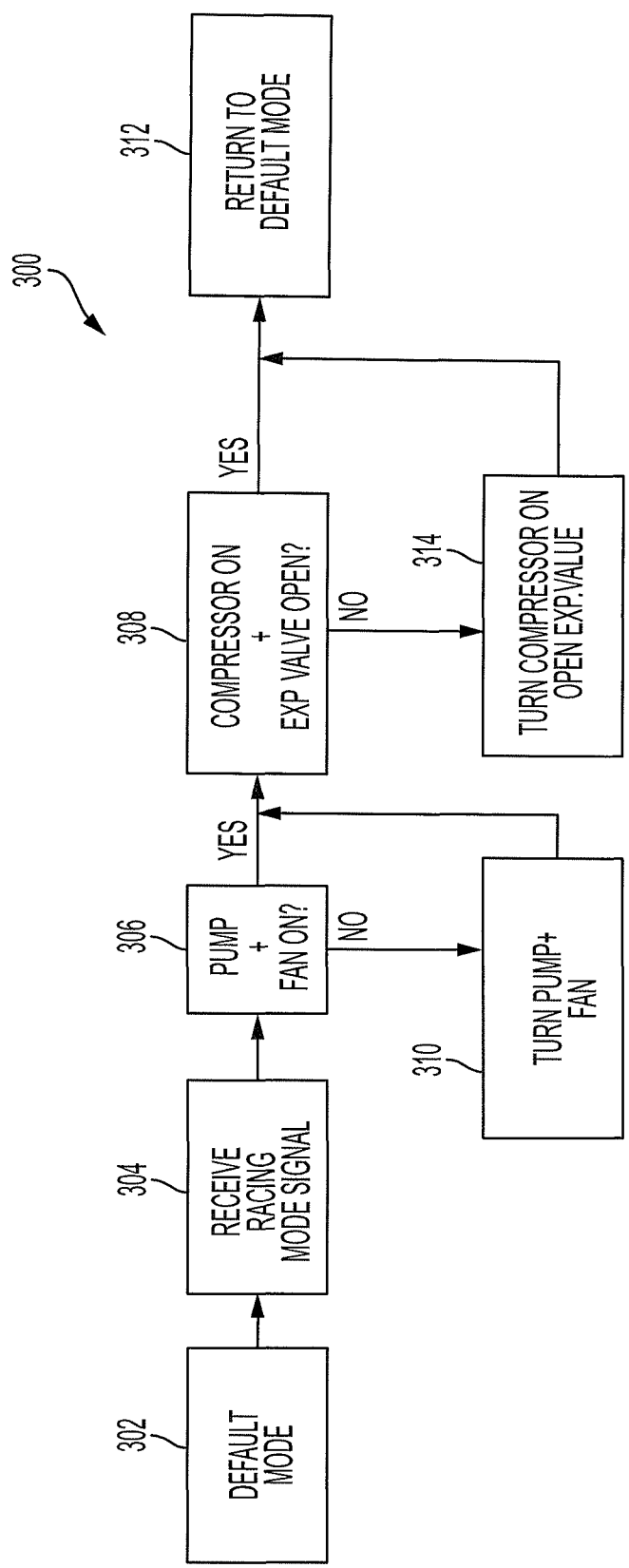
FIG. 3 is a schematic diagram of another example operation of the charge air cooler system shown in FIG. 1 in accordance with the principles of the present disclosure.

FIG. 3 illustrates an example method 300 of controlling a vehicle configured to operate between a default mode and a racing mode. The default mode can correspond to typical vehicle driving or performance (or a fuel economy mode), and the racing mode can correspond to the vehicle operating with increased engine output or performance. The method includes operating the vehicle in the default driving mode at step 302. At step 304, vehicle controller 60 receives a signal indicating the driver has activated the racing mode, for example, via a vehicle user interface (not shown). At step 306, controller 60 determines if pump 30 and fan 34 are on. If yes, control proceeds to step 308. If no, at step 310, controller 60 turns on pump 30 and fan 34. Control then proceeds to step 308.

At step 308, controller 60 determines if compressor 46 is on and if expansion valve 42 is open. If yes, control proceeds to step 312. If no, at step 314, controller 60 turns on compressor 46 and opens expansion valve 42. Control then proceeds to step 312. At step 312, controller 60 returns the vehicle to the default driving mode after receiving a signal indicating the driver has deactivated the racing mode or activated the default driving mode (e.g., via a touch screen user interface), or when the vehicle is restarted.

Described herein are system and methods for providing additional cooling to intake air or a charger intercooler. An air cooler system includes a two-stage, two-phase evaporative cooler to provide a merged low temperature cooling loop and AC cooling loop to save packaging space. The first loop includes a coolant pump to circulate coolant to cool a first layer of the intercooler. The second loop, which shares a condenser with the first loop, includes a compressor, expansion valve, and internal heat exchanger to circulate the coolant to provide further charge air cooling in a second layer of the intercooler. In some examples, the described system is configured to provide cooling of charge air to below ambient temperatures. The reduced charge air temperatures provided by the described system enable increased charge density, improved knock mitigation, elimination of a low temperature cooling circuit, and improved charge air cooler effectiveness due to multi-phase heat transfer in two stages. Moreover, the system is capable of providing improved vehicle fuel economy by enabling the engine to operate at higher compression ratios.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An air cooling system for a vehicle engine, the system comprising:
   an air intake configured to receive intake air for delivery to the engine;
   a first coolant loop thermally coupled to the air intake to provide cooling to the intake air;
   a second coolant loop thermally coupled to the air intake to provide further cooling to the intake air;

wherein the first and second coolant loops are separate loops using a common condenser, and wherein coolant in the second coolant loop undergoes a vapor compression cycle;

wherein the intake air is compressed charge air received from a turbocharger or a supercharger, and wherein the air intake includes an intercooler configured to cool the compressed charge air;

wherein the first coolant loop is thermally coupled to the intercooler to provide cooling to the compressed charge air; and wherein the second coolant loop is thermally coupled to the intercooler to provide further cooling to the compressed charge air; and a controller having a processor and memory, the controller in signal communication with a pump configured to circulate coolant through the first coolant loop, and a compressor configured to circulate the coolant through the second coolant loop, wherein upon receipt of a signal indicating a first measured air charge temperature (ACT) is greater than a target ACT, the controller is configured to turn the pump on.

2. The system of claim 1, wherein the intercooler includes a first charge air cooler layer and a second charge air cooler layer, the first and second charge air cooler layers being distinct layers.

3. The system of claim 2, wherein the first coolant loop is thermally coupled to the first charge air cooler layer and the second coolant loop is thermally coupled to the second charge air cooler layer.

4. The system of claim 1, wherein the first and second coolant loops circulate a shared refrigerant.

5. The system of claim 1, wherein the second coolant loop includes an expansion valve disposed in the second coolant loop at a location upstream of the intercooler and downstream of a condenser.

6. The system of claim 5, wherein the second coolant loop includes a first internal heat exchanger and a second internal heat exchanger.

7. The system of claim 6, wherein the first internal heat exchanger is disposed in the second coolant loop at a location upstream of the expansion valve and downstream of the condenser, and the second internal heat exchanger is disposed in the second coolant loop at a location downstream of the intercooler and upstream of the compressor.

8. The system of claim 1, wherein upon receipt of a signal indicating a second measured ACT is greater than the target ACT, the controller is configured to turn the compressor on.

9. The system of claim 8, wherein upon receipt of a signal indicating a third measured ACT is greater than the target ACT, the controller is configured to de-rate the vehicle engine through torque reduction due to engine management system intervention.

10. The system of claim 9, wherein upon receipt of a signal indicating the third measured ACT is less than the target ACT, the controller is configured to turn off the compressor, and wherein upon receipt of a signal indicating the second measured ACT is less than the target ACT, the controller is configured to turn off the pump.

* * * * *